United States Patent
Vemuri et al.

(10) Patent No.: US 12,399,704 B2
(45) Date of Patent: Aug. 26, 2025

(54) METHOD AND SYSTEM TO OPTIMIZE POWER UTILIZATION USING AN ALTERNATIVE POWER CONVERTER WHILE OPERATING VEHICLE SOFTWARE UPDATES

(71) Applicant: GM GLOBAL TECHNOLOGY OPERATIONS LLC, Detroit, MI (US)

(72) Inventors: Venkata Naga Siva Vikas Vemuri, Farmington Hills, MI (US); Chandra S. Namuduri, Troy, MI (US); Sitaram Emani, Novi, MI (US); Scott T. Droste, West Bloomfield, MI (US); John Sergakis, Bloomfield Hills, MI (US); Pavan Siddartha Aka, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 243 days.

(21) Appl. No.: 18/345,005

(22) Filed: Jun. 30, 2023

(65) Prior Publication Data

US 2025/0004748 A1    Jan. 2, 2025

(51) Int. Cl.
G06F 8/65        (2018.01)
G06F 1/3296      (2019.01)

(52) U.S. Cl.
CPC .............. *G06F 8/65* (2013.01); *G06F 1/3296* (2013.01)

(58) Field of Classification Search
CPC ........................... G06F 8/60–66; G06F 1/3296
(Continued)

(56) References Cited

U.S. PATENT DOCUMENTS

2014/0109075 A1    4/2014  Hoffman et al.
2017/0021737 A1*   1/2017  Park ........................ B60L 58/12
(Continued)

FOREIGN PATENT DOCUMENTS

CN        106335382 A  *  1/2017  ................ B60L 1/00
CN        113364867 A  *  9/2021
(Continued)

OTHER PUBLICATIONS

Over-the-air update, Wikipedia, 6 pages, May 27, 2023, [retrieved on Jun. 14, 2025], Retrieved from the Internet: < URL:https://web.archive.org/web/20230527075610/https://en.wikipedia.org/wiki/Over-the-air_update>.*

*Primary Examiner* — Geoffrey R St Leger
(74) *Attorney, Agent, or Firm* — Quinn IP Law

(57) ABSTRACT

A system for providing updates in a vehicle includes a server device configured for providing an OTA campaign update and the vehicle. The vehicle includes a device including software to be upgraded by the over-the-air campaign update and a low voltage battery providing low voltage power. The system further includes a battery providing high voltage power and an accessory power module configured to transform the high voltage power into low voltage power and including programming to estimate an available power of the low voltage battery. The system further includes a controller monitoring the available power, comparing the available power to a threshold, and, when the available power is less than the threshold, commanding the accessory power module to transform the high voltage power to provide the low voltage electrical power. The controller further schedules receiving the update based upon the available power and updates the device with the update.

17 Claims, 9 Drawing Sheets

(58) Field of Classification Search
USPC .................................................. 717/168–178
See application file for complete search history.

(56) References Cited

U.S. PATENT DOCUMENTS

| | | |
|---|---|---|
| 2018/0062153 A1 | 3/2018 | Zhu |
| 2022/0097672 A1* | 3/2022 | Komatsu ................. H04W 4/40 |
| 2022/0258640 A1 | 8/2022 | Ando |

FOREIGN PATENT DOCUMENTS

| | | | |
|---|---|---|---|
| CN | 115469898 A * | 12/2022 | ............... G06F 8/65 |
| DE | 102022114401 A1 | 2/2023 | |
| EP | 3770754 A1 * | 1/2021 | ........... G06F 21/577 |
| WO | WO-2010095260 A1 * | 8/2010 | ............ B60L 3/0007 |

* cited by examiner

METHOD AND SYSTEM TO OPTIMIZE POWER UTILIZATION USING AN ALTERNATIVE POWER CONVERTER WHILE OPERATING VEHICLE SOFTWARE UPDATES

BACKGROUND

The disclosure generally relates to a method and system to optimize vehicle power utilization using an internal source and/or alternative electric vehicle (EV) power converter for scaled vehicular services.

EVs operate based upon receiving electrical power from a battery or a plurality of batteries. EVs manage the electrical power that is available between charging events.

Vehicles include a plurality of devices with software. Many factors change over time for a vehicle and operation in changing environments. Software updates provide important flexibility and may improve operation of a vehicle as lessons are learned. A manufacturer or a software publisher may provide over-the-air (OTA) campaigns to update the software of vehicles.

SUMMARY

A system for providing updates to software in a vehicle to be updated is provided. The system includes a remote server device configured for providing an over-the-air campaign update to the vehicle to be updated. The system further includes the vehicle to be updated. The vehicle to be updated includes a device including software configured for being upgraded by the over-the-air campaign update and a relatively low voltage battery providing relatively low voltage direct current electrical power. The system further includes a relatively high voltage electric vehicle battery providing relatively high voltage direct current electrical power and an accessory power module configured to transform the relatively high voltage direct current electrical power into relatively low voltage direct current electrical power and including programming to estimate an available power of the relatively low voltage battery. The system further includes a supervisory controller including programming to monitor the available power of the relatively low voltage battery, compare the available power of the relatively low voltage battery to a threshold power level, and, when the available power of the relatively low voltage battery is equal to or less than the threshold power level, command the accessory power module to transform the relatively high voltage direct current electrical power to provide the relatively low voltage direct current electrical power. The supervisory controller further includes programming to schedule receiving the over-the-air campaign update based upon the available power of the relatively low voltage battery and update the software of the device with the over-the-air campaign update.

In some embodiments, the supervisory controller further includes programming to evaluate a situational awareness factor and reevaluate the estimated available power based upon the situational awareness factor.

In some embodiments, evaluating the situational awareness factor includes evaluating a vehicle location, scheduling data, a feature update list, a timeline, an average power degradation, or temperature.

In some embodiments, the supervisory controller further includes programming to monitor occurrence of a plug-in event and recalculating the available power of the relatively low voltage battery based upon charging performed during the plug-in event.

In some embodiments, the remote server device includes programming to map a list of a plurality of available over-the-air campaign updates to be operated for a group of vehicles with situational awareness information and send the list of the plurality of available over-the-air campaign updates to the group of vehicles including sending a relevant portion of the list of the plurality of available over-the-air campaign updates to the vehicle to be updated.

In some embodiments, the supervisory controller further includes programming to monitor situational awareness information of the vehicle to be updated and estimate available time periods in which to schedule receiving a plurality of over-the-air campaign updates corresponding to the relevant portion of the list of the plurality of available over-the-air campaign updates based upon the available power of the relatively low voltage battery and the situational awareness information. The supervisory controller further includes programming to schedule receiving the plurality of over-the-air campaign updates based upon the available time periods.

In some embodiments, the supervisory controller further includes programming to monitor actual power consumption through an operational period including the available time periods, compare the actual power consumption to a predictive power algorithm, and, when the actual power consumption exceeds power consumption predicted by the predictive power algorithm, adjust the available time periods based upon the actual power consumption.

According to one alternative embodiment, a system for providing updates to software in a plurality of vehicles is provided. The system includes a remote server device configured for providing an over-the-air campaign update to the plurality of vehicles and the plurality of vehicles. Each of the plurality of vehicles includes a device including software configured for being upgraded by the over-the-air campaign update and a relatively low voltage battery providing relatively low voltage direct current electrical power. Each of the plurality of vehicles further includes a relatively high voltage electric vehicle battery providing relatively high voltage direct current electrical power and an accessory power module configured to transform the relatively high voltage direct current electrical power into relatively low voltage direct current electrical power and including programming to estimate an available power of the relatively low voltage battery. Each of the plurality of vehicles further includes a supervisory controller including programming to monitor the available power of the relatively low voltage battery and compare the available power of the relatively low voltage battery to a threshold power level. The supervisory controller further includes programming to, when the available power of the relatively low voltage battery is equal to or less than the threshold power level, command the accessory power module to transform the relatively high voltage direct current electrical power to provide the relatively low voltage direct current electrical power. The supervisory controller further includes programming to schedule receiving the over-the-air campaign update based upon the available power of the relatively low voltage battery and update the software of the device with the over-the-air campaign update.

In some embodiments, the supervisory controller further includes programming to evaluate a situational awareness factor and reevaluate the estimated available power based upon the situational awareness factor.

In some embodiments, evaluating the situational awareness factor includes evaluating a vehicle location, scheduling data, a feature update list, a timeline, an average power degradation, or temperature.

In some embodiments, the remote server device includes programming to map a list of a plurality of available over-the-air campaign updates to be operated for the plurality of vehicles and send the list of the plurality of available over-the-air campaign updates to the group of vehicles including sending a relevant portion of the list of the plurality of available over-the-air campaign updates to each of the plurality of vehicles.

In some embodiments, the supervisory controller further includes programming to estimate available time periods in which to schedule receiving a plurality of over-the-air campaign updates corresponding to the relevant portion of the list of the plurality of available over-the-air campaign updates based upon the available power of the relatively low voltage battery and the situational awareness factor. The supervisory controller further includes programming to schedule receiving the plurality of over-the-air campaign updates based upon the available time periods.

In some embodiments, the supervisory controller further includes programming to monitor actual power consumption through an operational period including the available time periods, compare the actual power consumption to a predictive power algorithm, and, when the actual power consumption exceeds power consumption predicted by the predictive power algorithm, adjusting the available time periods based upon the actual power consumption.

In some embodiments, the remote server device includes programming to identify a group of vehicles within the plurality of vehicles to be updated with a same plurality of over-the-air campaign updates, evaluate the available power of the relatively low voltage battery of each of the group of vehicles, and schedule transmission of the plurality of the over-the-air campaign updates to each of the group of vehicles at simultaneous times based upon the evaluating.

In some embodiments, the remote server device includes programming to identify a group of vehicles within the plurality of vehicles to be updated with a same plurality of over-the-air campaign updates, evaluate the available power of the relatively low voltage battery of each of the group of vehicles, and schedule transmission of the plurality of the over-the-air campaign updates to each of the group of vehicles at a sequence of times based upon the evaluating.

According to one alternative embodiment, a method for providing updates to software in a vehicle is provided. The method includes, within the vehicle, receiving an over-the-air campaign update by the vehicle, operating a device including software configured for being upgraded by the over-the-air campaign update, operating a relatively low voltage battery providing relatively low voltage direct current electrical power, and operating a relatively high voltage electric vehicle battery providing relatively high voltage direct current electrical power. The method further includes, within the vehicle, operating an accessory power module configured to transform the relatively high voltage direct current electrical power into relatively low voltage direct current electrical power and including programming to estimate an available power of the relatively low voltage battery. The method further includes, within a computerized processor within the vehicle, monitoring the available power of the relatively low voltage battery and comparing the available power of the relatively low voltage battery to a threshold power level. The method further includes, within the computerized processor, when the available power of the relatively low voltage battery is equal to or less than the threshold power level, commanding the accessory power module to transform the relatively high voltage direct current electrical power to provide the relatively low voltage direct current electrical power. The method further includes, within the computerized processor, scheduling receiving the over-the-air campaign update based upon the available power of the relatively low voltage battery and updating the software of the device with the over-the-air campaign update.

In some embodiments, the method further includes, within the computerized processor within the vehicle, evaluating a situational awareness factor and reevaluating the estimated available power based upon the situational awareness factor.

In some embodiments, evaluating the situational awareness factor includes evaluating a vehicle location, scheduling data, a feature update list, a timeline, an average power degradation, or temperature.

In some embodiments, the method further includes, within the computerized processor within the vehicle, monitoring occurrence of a plug-in event and recalculating the available power of the relatively low voltage battery based upon charging performed during the plug-in event.

In some embodiments, the method further includes, within the remote server device, mapping a list of a plurality of available over-the-air campaign updates to be operated for a group of vehicles with situational awareness information and sending the list of the plurality of available over-the-air campaign updates to the group of vehicles including sending a relevant portion of the list of the plurality of available over-the-air campaign updates to the vehicle.

The above features and advantages and other features and advantages of the present disclosure are readily apparent from the following detailed description of the best modes for carrying out the disclosure when taken in connection with the accompanying drawings.

DETAILED DESCRIPTION

Figure 1:
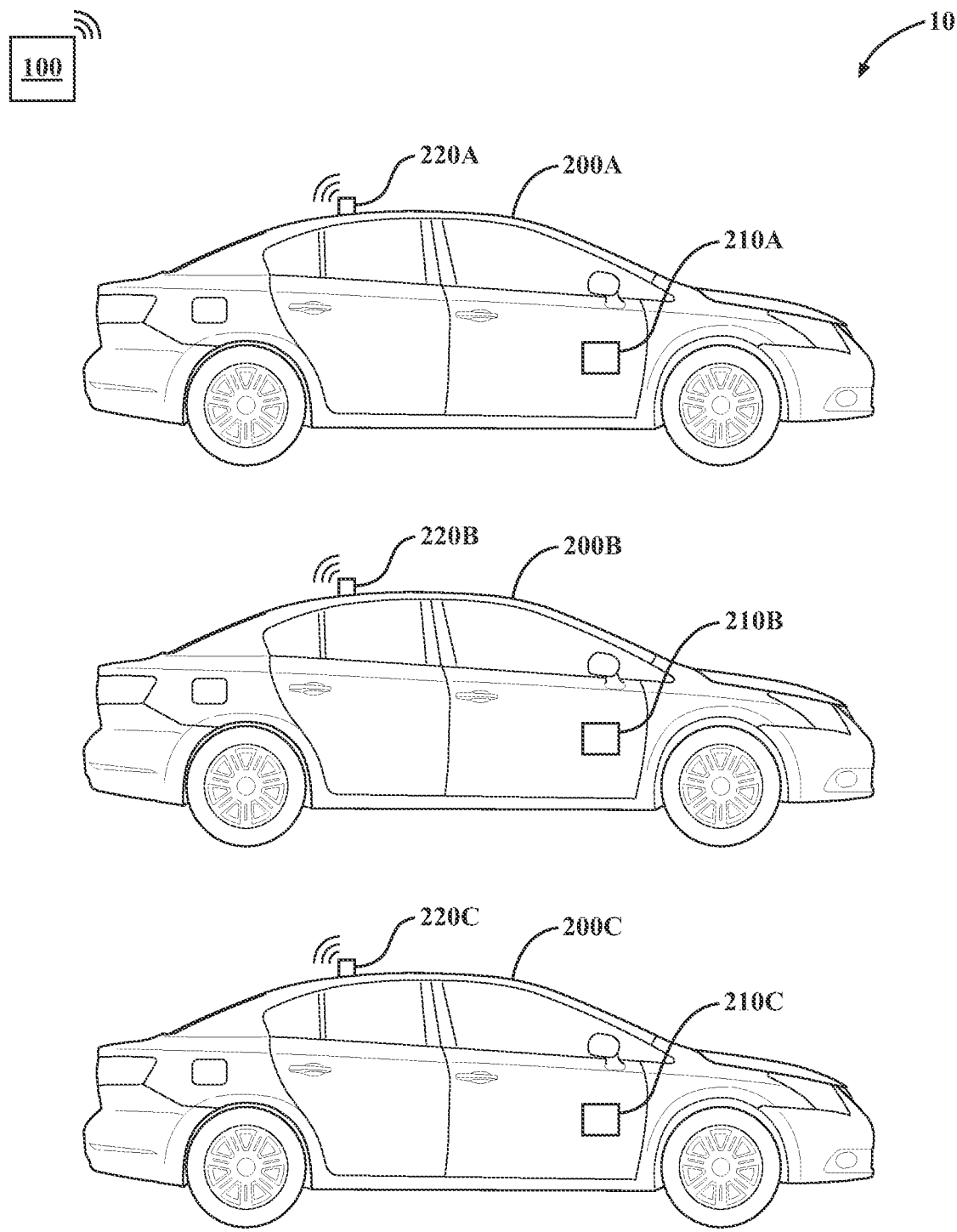
FIG. 1 schematically illustrates a system for operating OTA campaigns, in accordance with the present disclosure.

An electric vehicle (EV) may include a plurality of power systems and corresponding energy storage devices or batteries. In one exemplary configuration, a vehicle may include a high voltage power system, for example, providing and storing electrical energy in direct current at a relatively higher voltage, e.g., 400 Volts, 600 Volts, or 800 Volts. Such systems may further include a power inverter, useful to transform this higher voltage direct current electrical energy into alternating current electrical energy for use by an alternating current electric machine useful to provide motive force to the vehicle, and vice versa, enabling energy recovered through the electric machine to be stored by the battery of the high voltage power system. A vehicle may additionally include a low voltage power system, for example, providing and storing electrical energy at a low voltage, e.g. 12 Volts or similar. Vehicle accessory devices, such as radios, infotainment systems, vehicle controllers, etc. operate at low voltage.

An EV may be described as being in a low power mode of operation when the vehicle is ignition off, most of the vehicle systems are in a sleep mode, and the vehicle is disconnected from a charging unit and is functioning solely utilizing energy stored by the vehicle. Power management is important during operation in the low power mode of operation in order to maintain and prioritize operability and functionality of the vehicle and features thereof.

An over the air (OTA) campaign may be described as a software update or data package that a company or programming source may publish. An OTA campaign may be utilized to update software on a vehicle or provide content for vehicle accessory devices or systems such as an infotainment system. An OTA campaign is successful for a particular vehicle when the information is successfully transmitted from the source to the vehicle. An OTA campaign is unsuccessful for the vehicle when the information is not successfully transmitted to the vehicle, the transmission is incomplete, or the transmission is corrupted. While in the low power mode of operation, an OTA campaign to an EV may be unsuccessful if the vehicle does not have the electrical energy available to maintain power to the communications and computational system useful to successfully receive and process the OTA campaign.

Information provided in an OTA campaign may be communicated according to a number of various communications protocols. In one embodiment, an Internet of Things (IoT) protocol such as Message Queuing Telemetry Transport (MQTT) may be utilized to achieve the transfer of the information. The IoT protocol is a lightweight, publish-subscribe, machine to machine network protocol for message queue/message queuing service. It is designed for connections with remote locations that have devices with resource constraints or limited network bandwidth. The protocol runs over Transmission Control Protocol/Internet Protocol (TCP/IP), or over other network protocols that provide ordered, lossless, bi-directional connections. The IoT protocol enables use of a publish/subscribe message pattern which provides one-to-many message distribution and decoupling of applications. The IoT protocol includes a mechanism to notify interested parties when an abnormal disconnection occurs. Other communication protocols, such as Short Message/Messaging Service (SMS) may alternatively be utilized to conduct OTA campaigns.

With the advent of end-to-end vehicle software platforms that allow for frequent over-the-air software updates, there is a need for multi-mode push/pull feature co-existence. For example, the current models are not viable particularly in terms of power availability and utilization to download feature OTA campaigns within a time window of 10 minutes at a minimum data rate of 5 gigabytes per second in the low power mode.

Software updates such as OTA campaigns are important to maintaining a vehicle. Unsuccessful update attempts may be costly. A method and system for dynamic power converter management in a vehicle is provided, wherein vehicle power utilization and conversion and remote software updates are managed in an electric vehicle in an ignition-off and unplugged/not-charging state. The method includes utilizing an accessory power module (APM) to dynamically monitor a power degradation rate. The APM includes a computerized controller configured for monitoring electrical, thermal, and state of health parameters of the vehicle power system and estimating a power availability. Electrical power for vehicle accessories may be configured to operate at a relatively lower voltage, e.g., 12 Volts, with power supplied by a low voltage system such as a 12 Volt battery. Once the APM estimates that power availability of the low voltage power system nears threshold, a power converter is utilized to convert power from a high voltage power system, e.g., EV battery packs, to facilitate extended length for scaled feature demand of low voltage accessories while the vehicle is in the low power mode of operation.

The disclosed method and system make use of situational awareness-based power source optimization. Situational awareness information may include vehicle location, scheduling, feature update list, timeline, average power degradation, temperature, and other similar data to evaluate or reevaluate power source usage based on feedback. Situational awareness may enable the system to map the use of high voltage energy to provide low voltage energy at specific times for specific purposes during a pre-determined the low power mode timeline. In one embodiment, a power emulator analysis performed at each ignition state change may be provided to a remote server in order to perform situational awareness determinations for the vehicle.

Methods utilized in the art previously scheduled static data transfers/operation of an interaction environment based upon average population behaviors and ignition-off durations. The disclosed method and system include dynamic Transmission Control Protocol (TCP) optimization based on power consumption.

The disclosed method and system schedules transfer of information during defined IoT protocol intervals. The system monitors power consumption at IoT protocol intervals. Power degradation may be defined as how much energy has been consumed by the vehicle overall or since a last determination. If the power degradation is greater than a defined threshold power degradation, the system may determine whether the rate of consumption of power is significant i.e., greater than X %. If the rate of consumption of power is significant, the system may adjust the IoT protocol connection timeline, i.e., occurrence of the defined IoT protocol intervals, based on cost metrics to budget energy expenditure through the low power mode timeline. If the rate of consumption of power is not significant, the system may continue with currently defined IoT protocol intervals until the energy budget is consumed or until a plug-in event occurs. In one embodiment, adjustments to the IoT protocol connection may be configured to optimize successful completion of the OTA campaign update. In another embodiment, adjustments to the IoT protocol connection may be configured to avoid an OTA campaign update being performed at a same time that conversion of power from the relatively high voltage EV battery is initially engaged. In another embodiment, adjustments to the IoT protocol connection may be configured to avoid frequent updates contributing to high energy drain from the battery systems.

The disclosed method and system may determine a TCP update interval optimization based on power availability and situational awareness. A vehicle includes a plurality of features which may be available based upon the system providing power to the appropriate accessory devices. The system may map a list of feature OTA campaigns or scheduled updates to each of the plurality of accessory devices with situational awareness. The system may send the list of feature OTA campaigns with details to respective vehicles. Based on awareness information and power availability, the TCP sets IoT protocol update interval ping duration based on power availability and feature request timeline.

A remote server device operating an OTA campaign may utilize OTA campaign management based on determining a state of the plurality of vehicles to be updated. A plurality of vehicles to be updated may include relatively large numbers of vehicles. Bandwidth of the remote server device operating the OTA campaign may be limited, so the plurality of vehicles may be divided into cells, with each cell including a cell identification number. Each of the plurality of vehicles may send channel state information such as the cell identification number assigned to that vehicle and availability of the vehicle to operate an IoT protocol interval. The remote server device operating the OTA campaign may determine whether servicing the number of vehicles to be updated in a particular cell exceeds a maximum throughput threshold. If the maximum throughput threshold is exceeded, the system may distribute a consolidated multi-OTA campaign timeline across a defined time period at the cloud and push the campaign to the vehicle to conserve the energy budget.

In one embodiment, the remote server device operating the OTA campaign may monitor degradation of each of the vehicles in a cell or in a group, and the system may determine or modulate a time and frequency of the IoT protocol update interval pings based upon the state of the group. In one example, a group may be scheduled for updates based upon an average condition of the vehicles in the group. In another example, a group may be scheduled for updates based upon the vehicle with the most degradation in the group.

FIG. 1 schematically illustrates a system 10 for operating OTA campaigns. The system 10 includes a remote server device 100 and a plurality of vehicles 200A, 200B, 200C. Each of the vehicles 200A, 200B, 200C is illustrated including a supervisory controller 210A, 210B, 210C and a wireless communications device 220A, 220B, 220C, respectively. The remote server device 100 may be operated remotely and operates OTA campaigns, providing updates to accessory devices and systems of the plurality of vehicles 200A, 200B, 200C. Each of the vehicles 200A, 200B, 200C communicate wirelessly with the remote server device 100 through the respective wireless communications device 220A, 220B, 220C.

Figure 2:
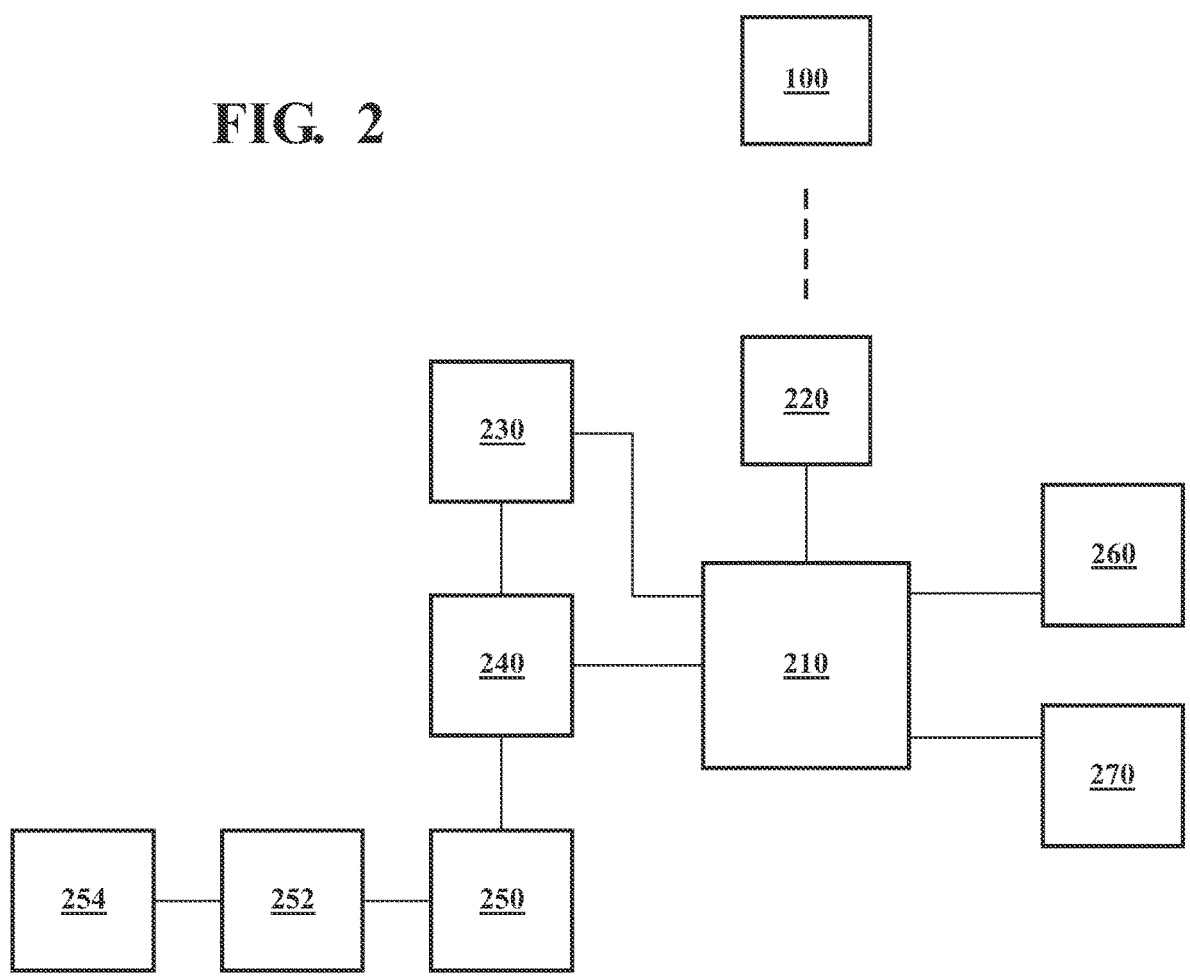
FIG. 2 schematically illustrates operation of a supervisory controller within a vehicle, in accordance with the present disclosure.

FIG. 2 schematically illustrates operation of a supervisory controller 210 within a vehicle. The supervisory controller 210 is exemplary of one of the supervisory controllers 210A, 210B, 210C of FIG. 1. The supervisory controller 210 is a computerized device and may include a processor configured for operating programmed code, random access memory (RAM), and durable memory such as a hard drive. A relatively high voltage EV battery 250 is illustrated, connected to a power inverter 252, which is in turn connected to an electric machine 254 including an output shaft configured to provide motive force to the vehicle. A relatively low voltage battery 230 is also illustrated. The relatively low voltage battery 230 may be configured for storing and providing electrical energy at 12 Volts direct current. An accessory power module (APM) 240 is also illustrated. The APM 240 is configured for selectively transforming relatively high voltage electrical power from the relatively high voltage EV battery 250 to provide relatively low voltage electrical power to the relatively low voltage battery 230 and other vehicle accessories and systems that are supplied electrical power at the relatively low voltage supplied by the relatively low voltage battery 230. The APM 240 may include power metering to measure or estimate a total amount of electrical energy expended by the relatively high voltage EV battery 250 to supply the relatively low voltage electrical power. Further, the APM 240 may include programming to operate a predicted power algorithm. This algorithm may monitor factors such as electrical factors, thermal factors, and battery state of health factors. The algorithm may provide an output or an estimate of power availability of the batteries 230, 250. This estimate of power availability is provided to the supervisory controller 210 and provides the supervisory controller 210 with a measure of how much energy is being consumed by the vehicle during the low power mode of operation and when threshold amounts of available energy will be reached through a time period of the low power mode of operation.

The supervisory controller 210 is in communication with the remote server device 100 through the wireless communications device 220. The supervisory controller 210 may receive data through communications device 220 and store data from the remote server device 100 including an executable or activatable software update for a vehicle system. An exemplary telematics device 260 and an exemplary vehicle navigation device 270 are illustrated. A number of additional or alternative vehicle devices or systems may be configured for receiving software updates from the remote server device 100 through the supervisory controller 210. Receipt or a method step of receiving an OTA campaign update from the remote server device 100 may include a wake-up event for the supervisory controller. In the low power mode of operation, with the ignition off and with no charging of the vehicle's batteries 230, 250 taking place, the systems of the vehicle including the supervisory controller 210 may be placed in a sleep mode or a non-functional state to reduce or eliminate electrical power draw from the systems. In order to receive the data related to an OTA campaign update, the supervisory controller 210 is subject to a wake-up event, electrical power is supplied to the supervisory controller 210 for a duration or a time period, and once the OTA campaign update is received, a next method step may take place. In one embodiment, the supervisory controller 210 may confirm that the OTA campaign update was properly received and stored, the time period may end, and the data from the OTA campaign update may be accessed and executed a next time the ignition state is turned on. In another embodiment, the supervisory controller 210 may receive the data from the OTA campaign update and may execute the update upon one of the devices 260, 270 prior to the time period ending and the supervisory controller going back into the sleep mode.

The remote server device 100 may request or announce that an OTA campaign update is available or should be scheduled for receipt by the supervisory controller 210. The supervisory controller 210 may utilize the request and estimate of available power to schedule an IoT protocol interval to receive the OTA campaign update.

Figure 3:
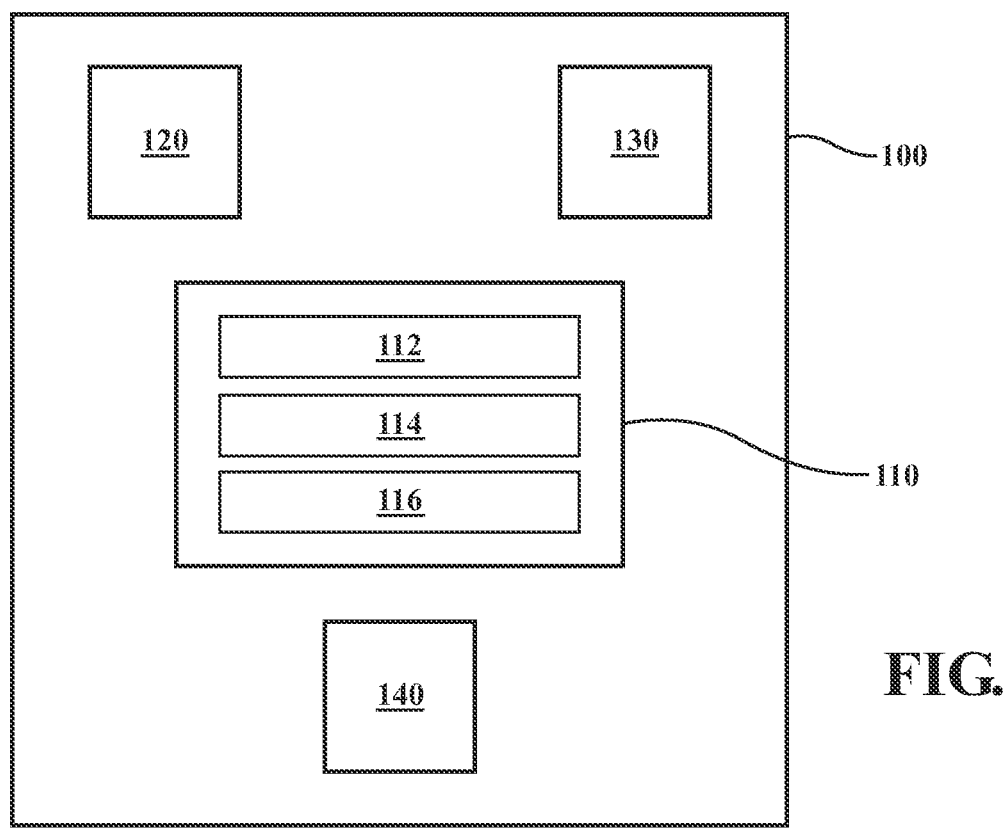
FIG. 3 schematically illustrates the remote server device of FIG. 1, in accordance with the present disclosure.

FIG. 3 schematically illustrates the remote server device 100 of FIG. 1. The remote server device 100 includes a computerized processing device 110, a communications device 120, an input/output coordination device 130, and a memory storage device 140. It is noted that the remote server device 100 may include other components and some of the components are not present in some embodiments.

The processing device 110 may include memory, e.g., read-only memory (ROM) and random-access memory (RAM), storing processor-executable instructions and one or more processors that execute the processor-executable instructions. In embodiments where the processing device 110 includes two or more processors, the processors may operate in a parallel or distributed manner. The processing device 110 may execute the operating system of the remote server device 100. Processing device 110 may include one or more modules executing programmed code or computerized processes or methods including executable steps. Illustrated modules may include a single physical device or functionality spanning multiple physical devices. The processing device 110 may further include programming modules, including an OTA campaign update module 112, a data transfer module 114, and a cell update module 116.

The communications device 120 may include a communications/data connection with a bus device configured to transfer data to different components of the system and may include one or more wireless transceivers for performing wireless communication.

The input/output coordination device 130 includes hardware and/or software configured to enable the processing device 110 to receive and/or exchange data with on-board resources of the remote server device 100, including input/output devices, a microphone, a speaker, and buttons installed to the remote server device 100.

The memory storage device 140 is a device that stores data generated or received by the remote server device 100. The memory storage device 140 may include, but is not limited to, flash or solid-state memory.

The OTA campaign update module 112 includes programming to enable remote server device 100 to receive and schedule OTA campaigns. The OTA campaign update module 112 may include information to determine or segment which vehicles among a group of vehicles should get a particular update. Such a determination may include determining which vehicles have particular features installed, have particular generations of devices installed, have a subscription service active for receiving updates, or other similar criteria.

The data transfer module 114 includes programming to execute data transfer events with vehicles. The data transfer module 114 may include programming specific to a protocol utilized for the data transfer, e.g., the IoT protocol. The data transfer module 114 may access stored data files, establish communications with one or more vehicles, transmit the stored data files, and confirm validity of the data transfer. The data transfer module 114 may include programming to track a list of vehicles and store data related to which vehicles have received which update.

The cell update module 116 includes programming to establish and track cells or groups of vehicles, determine a threshold throughput based upon how many vehicles the remote server device 100 may update simultaneously, and divide OTA campaign events according to the cells of vehicles and the threshold throughput.

The remote server device 100 is provided as an exemplary computerized device capable of executing programmed code to operate the disclosed system and method. A number of different embodiments of the remote server device 100 and modules operable therein are envisioned, and the disclosure is not intended to be limited to examples provided herein.

Figure 4:
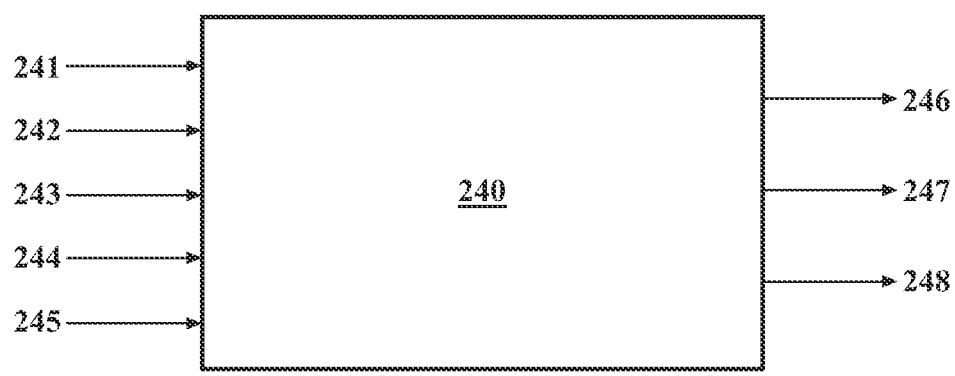
FIG. 4 schematically illustrates operation of the accessory power module (APM) of FIG. 2, in accordance with the present disclosure.

FIG. 4 schematically illustrates operation of the APM 240 of FIG. 2. The APM 240 is illustrated including programming to receive inputs and determine an estimated power available of battery 230 of the vehicle. Input 241 includes voltage in of the battery 230. Input 242 includes current in of the battery 230. Input 243 includes voltage out of the battery 230. Input 244 includes current out of the battery 230. Input 245 includes temperature of the battery 230. Output 246 includes a power out of the battery 230. Output 247 is the available power of the battery 230. Output 248 includes a maximum current of the battery 230.

Figure 5:
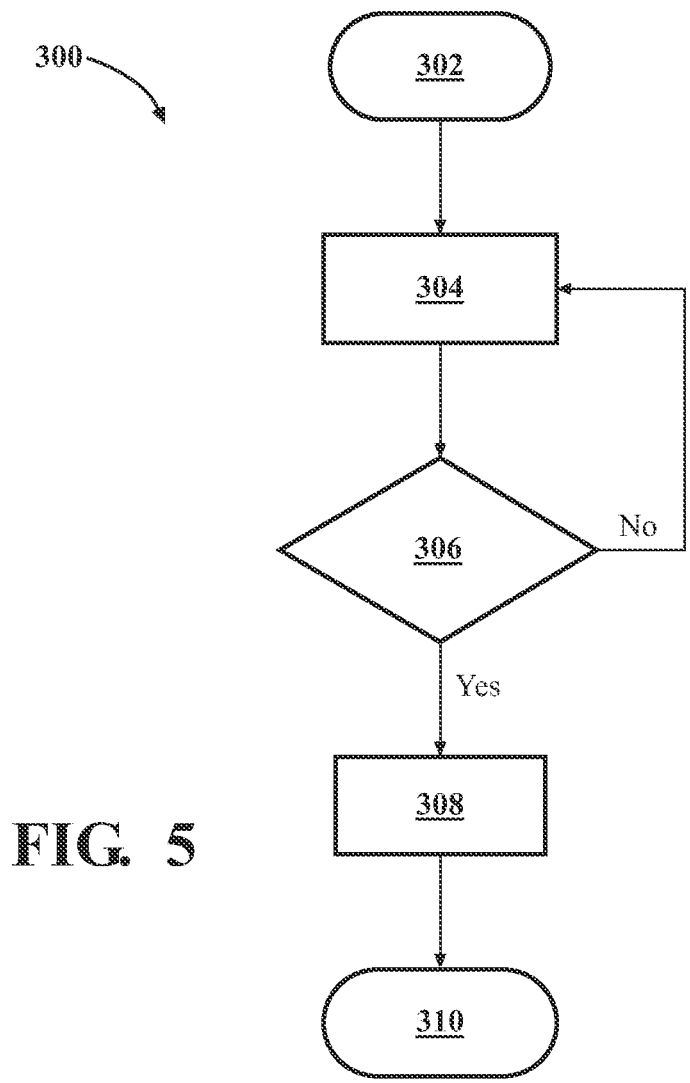
FIG. 5 is a flowchart illustrating a method to determine when to begin using the relatively high voltage EV battery of FIG. 2 to power low voltage vehicle devices, in accordance with the present disclosure.

FIG. 5 is a flowchart illustrating a method 300 to determine when to begin using the relatively high voltage EV battery 250 of FIG. 2 to power low voltage vehicle devices. The method 300 may be operated within the supervisory controller 210 of FIG. 2. In another embodiment, the method 300 may be operated within the APM 240 of FIG. 2. The method 300 is initiated when the vehicle is in the low power mode of operation and starts at step 302. At step 304, a periodic or dynamically operated estimate of accessory power module degradation is checked. This estimate of accessory power module degradation is a measure of how much power has been used from the relatively low voltage battery 230 so far during the low power mode of operation. At step 306, the estimate of accessory power module degradation is compared to a threshold power degradation. If the estimate of accessory power module degradation is not yet equal to or greater than the threshold power degradation, the method 300 returns to the step 304, wherein the estimate of accessory power module degradation is periodically or dynamically re-estimated. If the estimate of accessory power module degradation does equal or exceed the threshold power degradation, the method 300 advances to step 308, where the APM 240 controls activation of the relatively high voltage EV battery 250 and transforms the relatively high voltage direct current electric power of the relatively high voltage EV battery 250 into the relatively low voltage direct current electric power utilized by the vehicle systems. Power may be supplied by the relative high voltage EV battery 250 for some period of time until a threshold amount of power degradation of the relative high voltage EV battery 250 has occurred, when some other remedial step may be taken, such as alerting a user. At step 310, the method 300 ends. The method 300 includes exemplary steps for managing electrical power from a first relatively low voltage battery 230 and from a second relatively high voltage EV battery 250. A number of additional and/or alternative steps are envisioned, and the disclosure is not intended to be limited to the examples provided herein.

Figure 6:
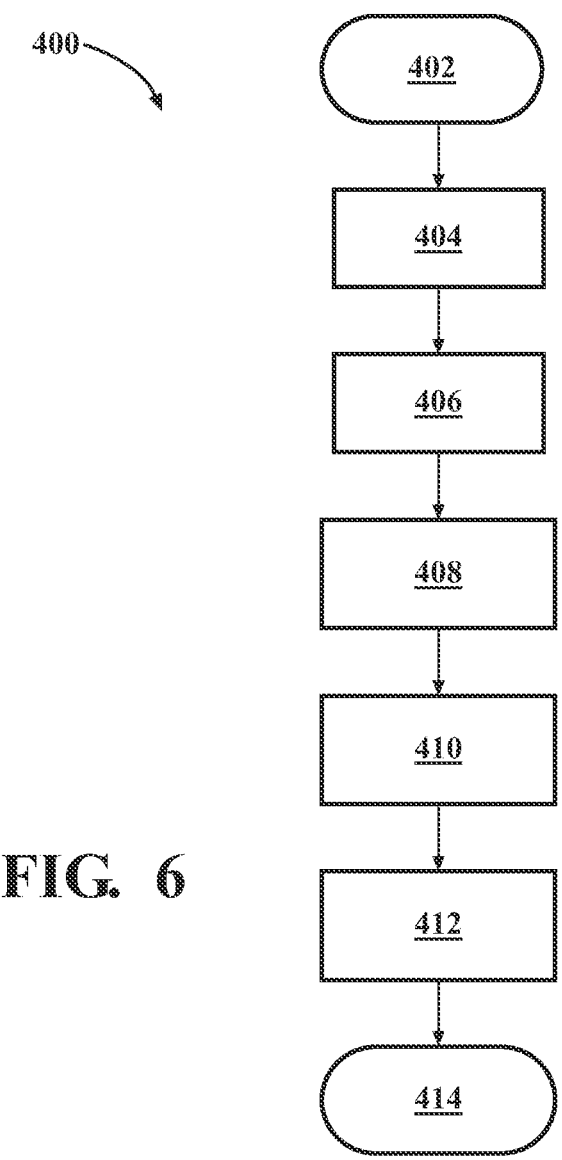
FIG. 6 is a flowchart illustrating a method to utilize situational awareness information to predict power usage over a period to improve scheduling of OTA campaign updates, in accordance with the present disclosure.

FIG. 6 is a flowchart illustrating a method 400 to utilize situational awareness information to predict power usage over a period to improve scheduling of OTA campaign updates. The method 400 is initiated when the vehicle is in the low power mode of operation and starts at step 402. At step 404, inputs regarding operation of the batteries 230, 250 of FIG. 2 and operation of other electrical system components are monitored, and a determination is made that relevant situational awareness information is available. At step 406, the inputs are processed and the situational awareness information is generated. The situational awareness information may include vehicle location, event scheduling related to power usage in the low power mode of operation, a list of features to be updated by an OTA campaign update, a timeline of factors such as historical charging events and future navigational routes entered by a user, average power degradation of the vehicle, and temperature. At step 408, predictive power degradation over a time period may be updated or re-evaluated based upon the situational awareness information. At step 410, a predictive map of using the APM 240 of FIG. 2 through the low power mode of operation to utilize relatively high voltage electric power to supply relatively low voltage electric power is determined. At step 412, at each ignition on event, an optimized power emulator analysis useful to scheduling OTA campaign updates is transmitted to the remote server device 100 of FIG. 2. At step 414, the method 400 ends. The method 400 includes exemplary steps for utilizing situational awareness information to plan or predict power degradation through the low power mode of operation. A number of additional and/or alternative steps are envisioned, and the disclosure is not intended to be limited to the examples provided herein.

Figure 7:
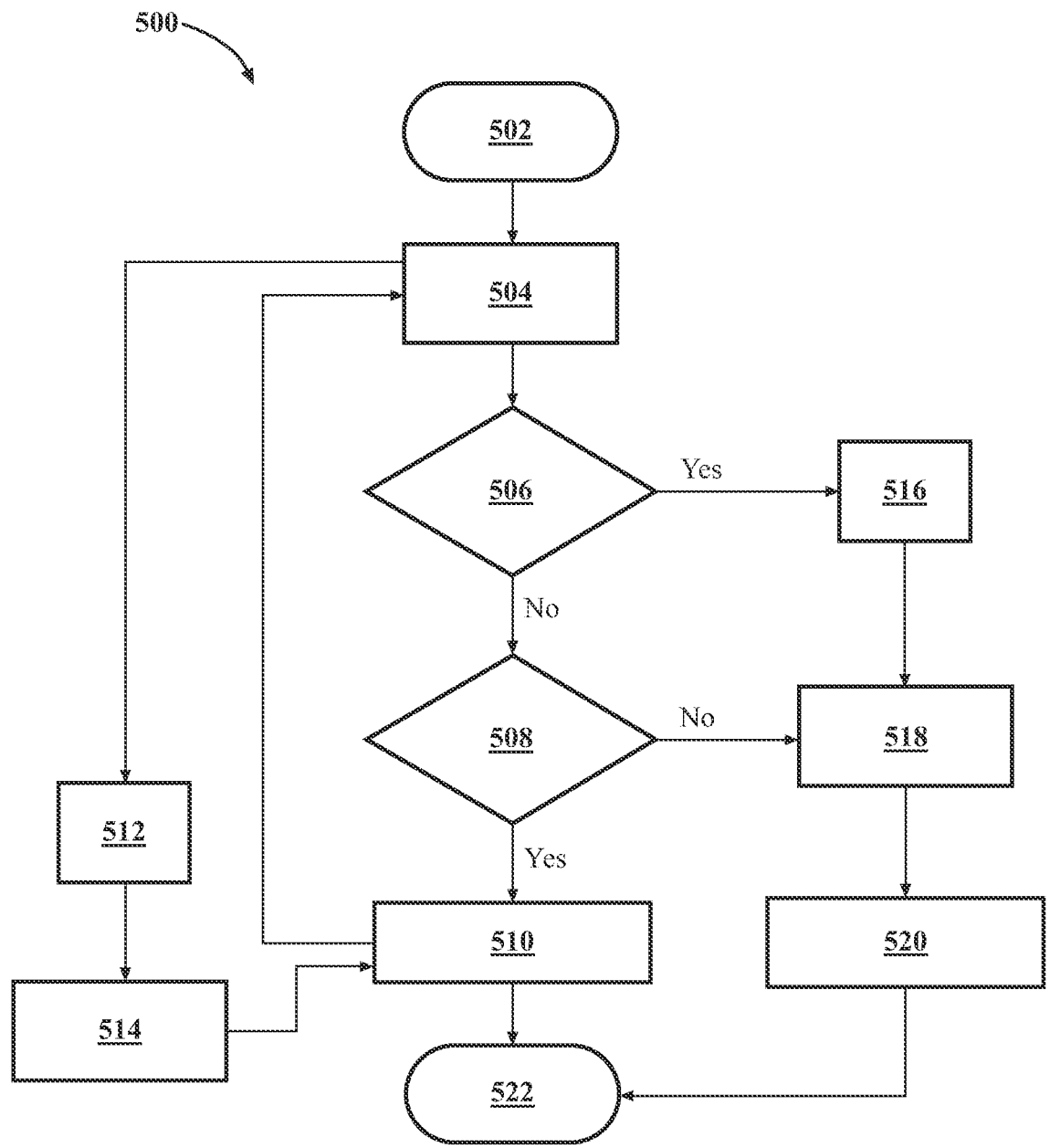
FIG. 7 is a flowchart illustrating a method to adjust or manage an Internet of Things (IoT) protocol connection timeline based upon power degradation and power consumption cost metrics, in accordance with the present disclosure.

FIG. 7 is a flowchart illustrating a method 500 to adjust or manage an IoT protocol connection timeline based upon power degradation and power consumption cost metrics. The method 500 is initiated when the vehicle is in the low power mode of operation and starts at step 502. At step 504, the supervisory controller 210 of FIG. 2 monitors power consumption at each IoT protocol interval or at each wake-up event scheduled to receive an OTA campaign update. At step 506, a determination is made whether a total power degradation meets or exceeds a threshold power degradation. If the total power degradation does not meet or exceed the threshold power degradation, the method 500 advances to step 508. If the total power degradation does meet or exceed the threshold power degradation, the method 500 advances to step 516.

At step 508, a determination whether a current rate of power consumption is less than a threshold power consumption. The threshold power consumption value may include an external factor adjustment for variables such as time of day or temperature. If the current rate of power consumption of less than the threshold power consumption, the method 500 advances to step 510, where an IoT protocol connection timeline is adjusted based upon cost metrics. If the current rate of power consumption is not less than the threshold power consumption, the method 500 advances to the step 518. At step 518, a current IoT protocol interval is continued until an energy budget is consumed. At step 520, once the energy budget is consumed, the supervisory controller may switch from IoT protocol operation to alternative connection methods based upon cost metrics.

At step 512, a plug-in charging event is monitored. At step 514, battery limits are recalculated based upon how much battery charging occurs (e.g., the available power of the relatively low voltage battery is recalculated.) The method then advances to the step 510, where the IoT protocol connection timeline is adjusted based upon cost metrics. At step 522, the method 500 ends. The method 500 may be reiterated. The method 500 includes exemplary steps for adjusting or managing an IoT protocol connection timeline based upon power degradation and power consumption cost metrics. A number of additional and/or alternative steps are envisioned, and the disclosure is not intended to be limited to the examples provided herein.

Figure 8:
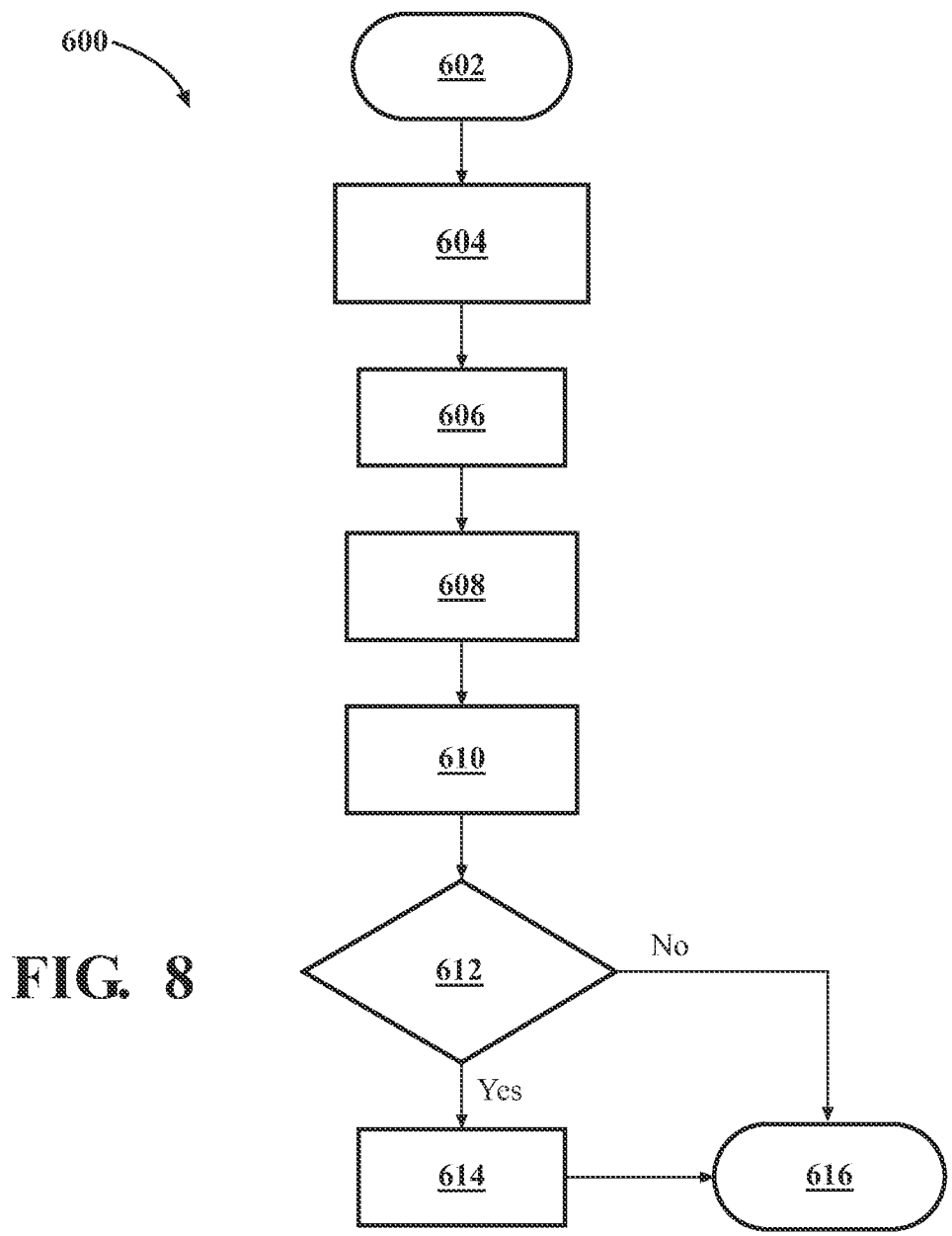
FIG. 8 is a flowchart illustrating a method for the remote server device and the supervisory controller of FIG. 2 coordinating information useful to schedule IoT protocol intervals, in accordance with the present disclosure.

FIG. 8 is a flowchart illustrating a method 600 for remote server device 100 and the supervisory controller 210 of FIG. 2 coordinating information useful to schedule IoT protocol intervals. The method 600 is initiated when the vehicle is in the low power mode of operation and starts at step 602. At step 604, the remote server device 100 maps a list of available OTA campaign updates to be operated for vehicles with situational awareness information. At step 606, the remote server device 100 sends the list of available OTA campaign updates to the respective vehicles. At step 608, the supervisory controller 210 in one of the vehicles monitors situational awareness information and estimated power availability for the vehicle and estimates available time periods in which to operate IoT protocol intervals to receive the OTA campaign updates. At step 610, the supervisory controller 210 sets an IoT protocol interval ping duration based upon the estimated power availability and the list of available OTA campaign updates. In one exemplary calculation, a vehicle may determine that 55 minute IoT protocol intervals are optimal to budget for nine days in the low power mode of operation. At step 612, actual power consumption is monitored and compared to predicted power consumption values from the estimated power availability after each IoT protocol interval. If the actual power consumption is greater than the predicted power consumption values, the method 600 advances to the step 614, where the IoT protocol interval is adjusted based upon the actual power consumption. After step 614, the method 600 advances to step 616. If the actual power consumption is not greater than the predicted power consumption, then the method 600 advances to step 616. At step 616, the method 600 ends. The method 600 includes exemplary steps for remote server device 100 and the supervisory controller 210 of FIG. 2 coordinating information useful to schedule IoT protocol intervals based upon power consumption in an EV vehicle in the low power mode of operation. A number of additional and/or alternative steps are envisioned, and the disclosure is not intended to be limited to the examples provided herein.

Figure 9:
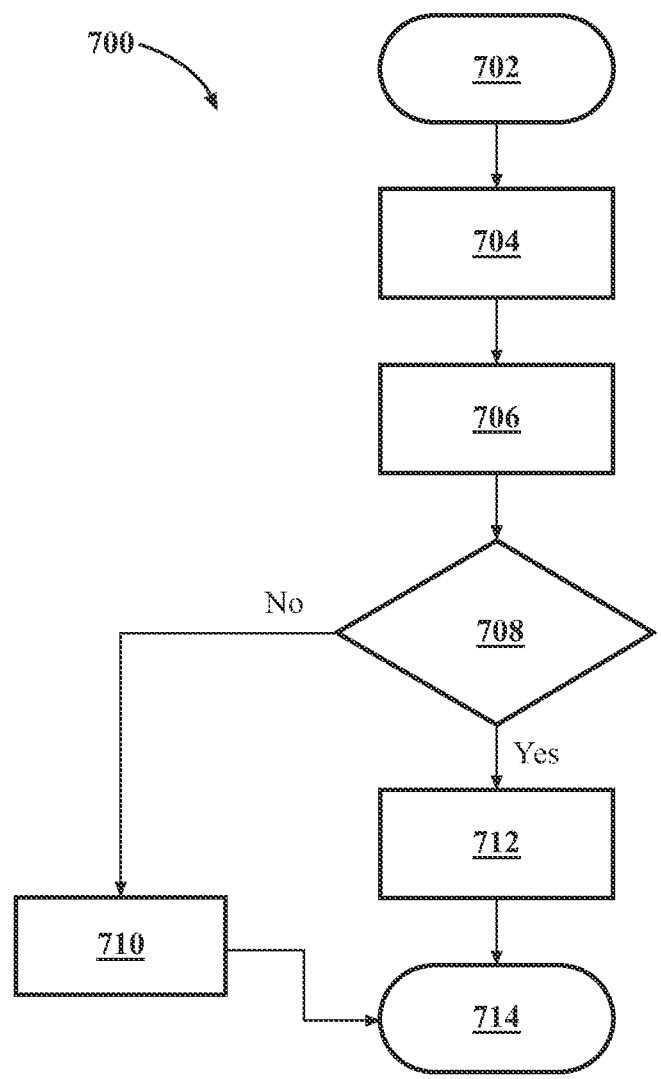
FIG. 9 is a flowchart illustrating a method for the remote server device of FIG. 1 managing an OTA campaign for a cell of vehicles, in accordance with the present disclosure.

FIG. 9 is a flowchart illustrating a method 700 for the remote server device 100 of FIG. 1 managing an OTA campaign for a cell of vehicles 200A, 200B, 200C. The method 700 starts at step 702. At step 704, the remote server device 100 identifies an OTA campaign that is to be sent to at least one cell or group of vehicles and sends a query to available vehicles for information. At step 706, the cell of vehicles 200A, 200B, 200C responds to the query with information useful to coordinating operation of the OTA campaign. The information may include a cell identification number for each vehicle 200A, 200B, 200C, a schedule of IoT protocol intervals for each vehicle 200A, 200B, 200C, communication bandwidth available for each vehicle 200A, 200B, 200C, etc. At step 708, the remote server device 100 uses the information provided to quantify an existing cell of vehicles and determine a throughput threshold or a maximum number of vehicles to be updated that the remote server device 100 may simultaneously provide the OTA campaign update. If the number of vehicles in the existing cell of vehicles exceeds the throughput threshold for the remote server device 100, then the method 700 advances to the step 712, wherein the remote server device 100 distributes the OTA campaign across a defined timeline, wherein each vehicle 200A, 200B, 200C is assigned a time "T" and receives the OTA campaign update at that time. If the number of vehicles in the existing cell of vehicles does not exceed the throughput threshold for the remote server device 100, then the method 700 advances to the step 710, wherein the remote server device pushes the campaign to the existing cell of vehicles at a same time. The method 700 ends at step 714. The method 700 includes exemplary steps for the remote server device 100 of FIG. 1 managing an OTA campaign for a cell of vehicles 200A, 200B, 200C. A number of additional and/or alternative steps are envisioned, and the disclosure is not intended to be limited to the examples provided herein.

Figure 10:
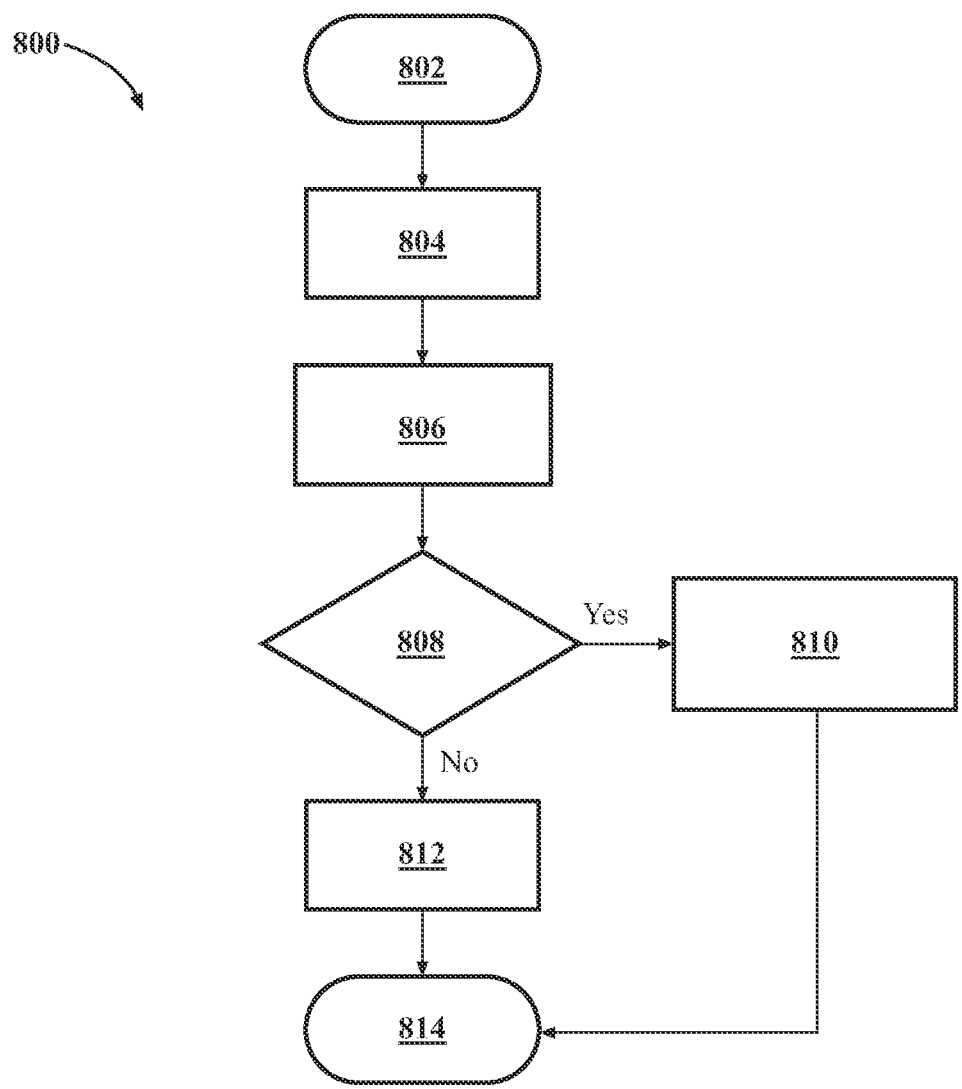
FIG. 10 is a flowchart illustrating a method for pattern-based group update interval optimization based upon relatively low voltage power degradation, in accordance with the present disclosure.

FIG. 10 is a flowchart illustrating a method 800 for pattern-based group update interval optimization based upon relatively low voltage power degradation. The method 800 starts at step 802. At step 804, the remote server device 100 of FIG. 1 identifies a group of vehicles 200A, 200B, 200C with a patterned feature update schedule or a schedule of desirable and appropriate updates that are common to each of the group of vehicles 200A, 200B, 200C. At step 806, the remote server device queries and maintains a power availability list based upon power availability information provided by each of the group of vehicles 200A, 200B, 200C. The information may be provided at power transition states, for example, each time that a wake-up event occurs or an ignition on event occurs on each of the vehicles 200A, 200B, 200C. At step 808, the remote server device 100 determines whether any of the vehicles 200A, 200B, 200C are experiencing a greater power degradation than an average power degradation value. If one of the vehicles is experiencing greater power degradation than the average power degradation value, then the method 800 advances to step 810, where the remote server device 100 may send feedback to the vehicle experiencing greater power degradation. The feedback may include exposure time information, cycle life information, and suggested IoT protocol interval duration. If none of the vehicles are experiencing greater power degradation than the average power degradation value, then the method 800 advances to step 812, where common update interval feedback is sent by the remote server device 100 to the vehicles 200A, 200B, 200C based upon a predicted feature update timeline. The method 800 ends at step 814. The method 800 includes exemplary steps for pattern-based group update interval optimization based upon relatively low voltage power degradation. A number of additional and/or alternative steps are envisioned, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A system for providing updates to software in a vehicle to be updated, comprising:
    a remote server device configured for providing an over-the-air campaign update to the vehicle to be updated; and
    the vehicle to be updated including:
        a device including software configured for being upgraded by the over-the-air campaign update;
        a relatively low voltage battery providing relatively low voltage direct current electrical power;
        a relatively high voltage electric vehicle battery providing relatively high voltage direct current electrical power;
        an accessory power module configured to transform the relatively high voltage direct current electrical power into the relatively low voltage direct current electrical power and including programming to estimate an available power of the relatively low voltage battery;
        a supervisory controller including programming to:
            monitor the available power of the relatively low voltage battery;
            compare the available power of the relatively low voltage battery to a threshold power level;
            when the available power of the relatively low voltage battery is equal to or less than the threshold power level, command the accessory power module to transform the relatively high voltage direct current electrical power to provide the relatively low voltage direct current electrical power;
            schedule receiving the over-the-air campaign update based upon the available power of the relatively low voltage battery; and
            update the software of the device with the over-the-air campaign update;
        wherein the remote server device includes programming to:
            map a list of a plurality of available over-the-air campaign updates to be operated for a group of vehicles with situational awareness information; and
            send the list of the plurality of available over-the-air campaign updates to the group of vehicles including sending a relevant portion of the list of the plurality of available over-the-air campaign updates to the vehicle to be updated;
        wherein the supervisory controller further includes programming to:
            monitor situational awareness information of the vehicle to be updated;
            estimate available time periods in which to schedule receiving a plurality of over-the-air campaign updates corresponding to the relevant portion of the list of the plurality of available over-the-air campaign updates based upon the available power of the relatively low voltage battery and the situational awareness information; and
            schedule receiving the plurality of over-the-air campaign updates based upon the available time periods.

2. The system of claim 1, wherein the supervisory controller further includes programming to:
    evaluate a situational awareness factor; and
    reevaluate the estimated available power based upon the situational awareness factor.

3. The system of claim 2, wherein evaluating the situational awareness factor includes evaluating a vehicle location, scheduling data, a feature update list, a timeline, an average power degradation, or temperature.

4. The system of claim 1, wherein the supervisory controller further includes programming to:
    monitor occurrence of a plug-in event; and
    recalculate the available power of the relatively low voltage battery based upon charging performed during the plug-in event.

5. The system of claim 1, wherein the supervisory controller further includes programming to:
    monitor actual power consumption through an operational period including the available time periods;
    compare the actual power consumption to a predictive power algorithm; and
    when the actual power consumption exceeds power consumption predicted by the predictive power algorithm, adjust the available time periods based upon the actual power consumption.

6. A system for providing updates to software in a plurality of vehicles, comprising:
a remote server device configured for providing an over-the-air campaign update to the plurality of vehicles; and
the plurality of vehicles, each of the plurality of vehicles including:
a device including software configured for being upgraded by the over-the-air campaign update;
a relatively low voltage battery providing relatively low voltage direct current electrical power;
a relatively high voltage electric vehicle battery providing relatively high voltage direct current electrical power;
an accessory power module configured to transform the relatively high voltage direct current electrical power into the relatively low voltage direct current electrical power and including programming to estimate an available power of the relatively low voltage battery;
a supervisory controller including programming to:
monitor the available power of the relatively low voltage battery;
compare the available power of the relatively low voltage battery to a threshold power level;
when the available power of the relatively low voltage battery is equal to or less than the threshold power level, command the accessory power module to transform the relatively high voltage direct current electrical power to provide the relatively low voltage direct current electrical power;
schedule receiving the over-the-air campaign update based upon the available power of the relatively low voltage battery;
update the software of the device with the over-the-air campaign update;
wherein the remote server device includes programming to:
identify a group of vehicles within the plurality of vehicles to be updated with a same plurality of over-the-air campaign updates;
evaluate the available power of the relatively low voltage battery of each of the group of vehicles; and
schedule transmission of the plurality of the over-the-air campaign updates to each of the group of vehicles at simultaneous times based upon the evaluating.

7. The system of claim 6, wherein the supervisory controller further includes programming to:
evaluate a situational awareness factor; and
reevaluate the estimated available power based upon the situational awareness factor.

8. The system of claim 7, wherein evaluating the situational awareness factor includes evaluating a vehicle location, scheduling data, a feature update list, a timeline, an average power degradation, or temperature.

9. The system of claim 7, wherein the remote server device includes programming to:
map a list of a plurality of available over-the-air campaign updates to be operated for the plurality of vehicles; and
send the list of the plurality of available over-the-air campaign updates to the plurality of vehicles including sending a relevant portion of the list of the plurality of available over-the-air campaign updates to each of the plurality of vehicles.

10. The system of claim 9, wherein the supervisory controller further includes programming to:
estimate available time periods in which to schedule receiving a plurality of over-the-air campaign updates corresponding to the relevant portion of the list of the plurality of available over-the-air campaign updates based upon the available power of the relatively low voltage battery and the situational awareness factor; and
schedule receiving the plurality of over-the-air campaign updates based upon the available time periods.

11. The system of claim 10, wherein the supervisory controller further includes programming to:
monitor actual power consumption through an operational period including the available time periods;
compare the actual power consumption to a predictive power algorithm; and
when the actual power consumption exceeds power consumption predicted by the predictive power algorithm, adjusting the available time periods based upon the actual power consumption.

12. A system for providing updates to software in a plurality of vehicles, comprising:
a remote server device configured for providing an over-the-air campaign update to the plurality of vehicles; and
the plurality of vehicles, each of the plurality of vehicles including:
a device including software configured for being upgraded by the over-the-air campaign update;
a relatively low voltage battery providing relatively low voltage direct current electrical power;
a relatively high voltage electric vehicle battery providing relatively high voltage direct current electrical power;
an accessory power module configured to transform the relatively high voltage direct current electrical power into the relatively low voltage direct current electrical power and including programming to estimate an available power of the relatively low voltage battery;
a supervisory controller including programming to:
monitor the available power of the relatively low voltage battery;
compare the available power of the relatively low voltage battery to a threshold power level;
when the available power of the relatively low voltage battery is equal to or less than the threshold power level, command the accessory power module to transform the relatively high voltage direct current electrical power to provide the relatively low voltage direct current electrical power;
schedule receiving the over-the-air campaign update based upon the available power of the relatively low voltage battery;
update the software of the device with the over-the-air campaign update;
wherein the remote server device includes programming to:
identify a group of vehicles within the plurality of vehicles to be updated with a same plurality of over-the-air campaign updates;
evaluate the available power of the relatively low voltage battery of each of the group of vehicles; and
schedule transmission of the plurality of the over-the-air campaign updates to each of the group of vehicles at a sequence of times based upon the evaluating.

13. The system of claim 12, wherein the supervisory controller further includes programming to:
evaluate a situational awareness factor; and
reevaluate the estimated available power based upon the situational awareness factor.

14. The system of claim 13, wherein evaluating the situational awareness factor includes evaluating a vehicle location, scheduling data, a feature update list, a timeline, an average power degradation, or temperature.

15. The system of claim 13, wherein the remote server device includes programming to:
map a list of a plurality of available over-the-air campaign updates to be operated for the plurality of vehicles; and
send the list of the plurality of available over-the-air campaign updates to the plurality of vehicles including sending a relevant portion of the list of the plurality of available over-the-air campaign updates to each of the plurality of vehicles.

16. The system of claim 15, wherein the supervisory controller further includes programming to:
estimate available time periods in which to schedule receiving a plurality of over-the-air campaign updates corresponding to the relevant portion of the list of the plurality of available over-the-air campaign updates based upon the available power of the relatively low voltage battery and the situational awareness factor; and
schedule receiving the plurality of over-the-air campaign updates based upon the available time periods.

17. The system of claim 16, wherein the supervisory controller further includes programming to:
monitor actual power consumption through an operational period including the available time periods;
compare the actual power consumption to a predictive power algorithm; and
when the actual power consumption exceeds power consumption predicted by the predictive power algorithm, adjusting the available time periods based upon the actual power consumption.

* * * * *